United States Patent [19]

Tenma

[11] Patent Number: 5,040,076
[45] Date of Patent: Aug. 13, 1991

[54] VIDEO DISK PLAYER INCLUDING SIGNAL SWITCHING SYNCHRONIZATION

[75] Inventor: Tetsuya Tenma, Saitama, Japan
[73] Assignee: Pioneer Electronic Corporation, Tokyo, Japan
[21] Appl. No.: 367,583
[22] Filed: Jun. 19, 1989
[30] Foreign Application Priority Data
  Nov. 1, 1988 [JP] Japan .................. 63-276891
[51] Int. Cl.⁵ .................................. G11B 15/52
[52] U.S. Cl. ................................. 358/321; 358/335; 369/50; 360/73.01
[58] Field of Search ............... 358/320, 321, 322, 337, 358/338, 342, 324, 184; 360/73.01, 73.03, 73.11, 73.12, 73.13, 77.13, 77.12, 76.00; 369/50

[56] References Cited
U.S. PATENT DOCUMENTS

| | | | |
|---|---|---|---|
| 4,018,987 | 4/1977 | Keizer | 360/73.03 |
| 4,370,679 | 1/1983 | Ceshkovsky et al. | 358/318 |
| 4,371,899 | 2/1983 | Ceshkovsky et al. | 358/338 |
| 4,376,955 | 3/1983 | Reitmier | 358/314 |
| 4,835,623 | 5/1989 | Okano et al. | 358/338 |

FOREIGN PATENT DOCUMENTS
62-32545 12/1987 Japan .

Primary Examiner—Roy N. Envall, Jr.
Assistant Examiner—Huy Nguyen
Attorney, Agent, or Firm—Sughrue, Mion, Zinn, Macpeak & Seas

[57] ABSTRACT

In a video disk player, internal and external synchronization are based on comparing the phases of reproduced and reference pulses. The controlled frequencies responsive to the phase difference are controlled at $4f_{sc}$, where $f_{sc}$ is the color subcarrier frequency. The control loop for controlling the spindle speed, and therefore setting the synchronization of the read out, operates on the $4f_{sc}$ signal, which is frequency divided on the same integrated chip as the spindle servo electronic, to provide the horizontal synchronization control.

8 Claims, 3 Drawing Sheets

1

VIDEO DISK PLAYER INCLUDING SIGNAL SWITCHING SYNCHRONIZATION

BACKGROUND OF THE INVENTION

1. Technical Field

The present invention relates to a video disk player for enabling a disk on which a video signal is recorded.

2. Technical Background

When a plurality of video signal picture images provided by a plurality of video disk players are synthesized by a plurality of display devices, it is necessary to perform a so-called external synchronization such that the plurality of, video disk players play the disk in synchronization with the same external synchronization signal. FIG. 3 shows a conventional video disk player for enabling such an external synchronization.

In the video disk player 10 shown in FIG. 3, disk 1 is driven and rotated by spindle motor 2. A signal recorded on disk 1 is read by pickup 3 through the rotation of disk 1. An RF (high frequency) signal output from pickup 3 is amplified by RF amplifier 4 and supplied to FM-demodulating circuit 5 to reproduce a video signal. As is well known, the player comprises a focus servo loop for converging a light beam emitted from pickup 3 onto a recording face of disk 1 and to form a light spot for reading information, and a tracking servo loop for causing the light spot to accurately follow a recording track of disk 1, etc. although these servo loops are not shown in FIG. 3.

The read video signal outputted from FM-demodulating circuit 5 is supplied to one input terminal of changeover switch 6 and synchronization separating circuit 7. A horizontal synchronization signal is separated by synchronization separating circuit 7 from the read video signal and is supplied to spindle servo circuit 8. Spindle servo circuit 8 is constructed such that spindle motor 2 is driven in accordance with the difference in phase between a reproduced horizontal synchronization signal and a reference horizontal synchronization signal described later.

An external reference composite synchronization signal is generated by circuit g and supplied through an input terminal of video disk player 10 to circuit 11 for generating the external reference horizontal synchronization signal, circuit 12 for generating a reference frame pulse, and circuit 13 for detecting an external input. Reference frame pulse generating circuit 12 is constructed to output the reference frame pulse generated once every frame period in synchronization with the beginning of each frame defined by the external reference composite synchronization signal. The output of reference frame pulse generating circuit 12 is supplied to phase comparing circuit 14 and is compared in phase with a reproduced frame pulse outputted from reproducing frame pulse generating-circuit 15.

Reproducing frame pulse generating circuit 15 is constructed to output the reproducing frame pulse generated once every frame period in synchronization with the beginning of each frame of the read video signal as defined by a vertical synchronization signal and an equivalent pulse in the reproduced composite synchronization signal separated from the read video signal by synchronization separating circuit 7, for example. Phase comparing circuit 14 produces a difference signal in accordance with the difference in phase between the reference and reproduced frame pulses. This difference signal is inputted as a control signal to VCO (voltage control-type oscillator) 16. VCO 16 is constructed such that a self-scanning frequency is approximately equal to a horizontal synchronization frequency. An oscillating frequency of this VCO 16 is changed in accordance with the difference signal from phase comparing circuit 14 with the horizontal synchronization frequency as a center. The output of VCO 16 is supplied to one input terminal of change-over switch 17.

The external reference horizontal synchronization signal is separated from the external reference composite synchronization signal by external reference horizontal synchronization signal generating circuit 11 and is supplied to the other input terminal of change-over switch 17. An output of lock detecting circuit 18 is supplied as a switch control signal to change-over switch 17. Lock detecting circuit 18 is constructed to output a lock detecting signal when the level in voltage of the difference signal outputted from phase comparing circuit 14 is less than a predetermined value. Change-over switch 17 selectively outputs the external reference horizontal synchronization signal when the lock detecting signal is provided, and selectively outputs the output of VCO 16 when the lock detecting signal is not provided.

The output of change-over switch 17 is supplied to one input terminal of change-over switch 19. An internal reference horizontal synchronization signal outputted from frequency divider 21 is supplied to the other input terminal of change-over switch 19. Frequency divider 21 divides the frequency of a signal having frequency $4f_{sc}$ (four times a color subcarrier frequency) outputted from oscillator 22 and produces the internal reference horizontal synchronization signal having a frequency equal to that of the horizontal synchronization signal. An output of external input detecting circuit 13 is supplied as a control signal to change-over switch 19. External input detecting circuit 13 detects that the external reference composite synchronization signal is supplied by detecting the interval of an input pulse by e.g., a monostable multivibrator, etc., and generates an external input detecting signal. Change-over switch 19 selectively outputs the output of change-over 17 when the external input detecting signal is provided, and selectively outputs the internal reference horizontal synchronization signal as an output of frequency divider 21 when the external input detecting signal is not provided.

The output of change-over switch 19 is supplied to spindle servo circuit 8 as a reference horizontal synchronization signal. The output of oscillator 22 is supplied to background or back video generating circuit 23. Background video generating circuit 23 controls the operation of a character generator, etc., by the output of oscillator 22 for example, and generates a background video signal corresponding to a predetermined image. The output of background video generating circuit 23 is supplied to the other input terminal of change-over switch 6. A squelch command signal outputted from squelch command signal generating circuit 24 is supplied to a control input terminal of change-over switch 6. Squelch command signal generating circuit 24 generates the squelch command signal when servo loops of e.g., a focus servo loop, etc., attain a non-lock state. Change-over switch 6 selectively outputs a read video signal outputted from FM-demodulating circuit 5 when the squelch command signal is not provided, and selectively outputs the background video signal outputted from background video generating circuit 23 when the squelch command signal is provided.

In the above-mentioned construction, when the external reference composite synchronization signal is not provided from external reference composite synchronization signal generating circuit 9, the external input detecting signal is not outputted from external input detecting circuit 13, and the internal reference horizontal synchronization signal outputted from frequency divider 21 is selectively outputted from change-over switch 19. When this internal reference horizontal synchronization signal is supplied to spindle servo circuit 8, the rotary speed of spindle motor 2 is controlled such that the phase of the horizontal synchronization signal in the read video signal is in conformity with the phase of the internal reference horizontal synchronization signal, thereby performing a control with respect to the time axis of the read video signal.

When the external reference composite synchronization signal is supplied from external reference composite synchronization signal generating circuit 9, the external input detecting signal is outputted from external input detecting circuit 13 and is supplied to change-over switch 19. Thus, the output of change-over switch 17 is selectively outputted from change-over switch 19. At this time, when the lock detecting signal is not outputted from lock detecting circuit 18, the output of VCO 16 is selectively outputted from change-over switch 17. VCO 16 is oscillated at a frequency in accordance with the difference in phase between the reference frame pulse and the reproduced frame pulse. The output of VCO 16 is supplied to spindle servo circuit 8 as the reference horizontal synchronization signal so that the rotary speed of spindle motor 2 is accelerated and decelerated in accordance with the phase difference between the reference and reproduced frame pulses. When the reproduced frame pulses are in advance of the reference frame pulses, the oscillating frequency of VCO 16 is lowered and a loop delaying the reproduced frame pulses is formed so that both frame phases are changed so as to be in conformity with each other. As a result, first and second fields of the reproduced composite synchronization signal and vertical synchronization signal are in conformity with the external reference composite synchronization signal. At this time, when the phase difference of both frames becomes less then a predetermined value (e.g., 0.5 H), the lock detecting signal is outputted from lock detecting circuit 18 and the output of external reference horizontal synchronization signal generating circuit 11, i.e., the stable external reference horizontal signal, is selectively outputted from change-over switch 17, thereby completing the external synchronization.

In the conventional apparatus mentioned above, change-over switch 19 is connected between frequency divider 21 and spindle servo circuit 8. This makes it impossible to use an integrated circuit with the spindle servo circuit 8 and frequency divider 21 formed on a single chip, whereby the reference horizontal synchronization signal could be internally produced. Further, oscillator 22 is different from a reference oscillator for generating the external reference composite synchronization signal in external reference composite synchronization signal generating circuit 9. Therefore, the timing of the vertical synchronization signal is shifted when the read video signal and the background video signal are switched by change-over switch 6, thereby disturbing a reproduced image.

SUMMARY OF THE INVENTION

To solve the above-mentioned problems, an object of the present invention is to provide a video disk player in which an integrated circuit is provided that may be used for any video disk player and which does not disturb the image at the switching time of the read video signal provided from a disk and the background video signal provided by a character generator, etc.

With the above object in mind, the present invention resides in a video disk player including a reproduced frame signal generating means for generating a reproduced frame signal once every frame period based on a synchronization signal in a read video signal provided from a disk; reference frame signal generating means for generating a reference frame signal once every frame period based on an external reference synchronization signal supplied from the exterior of the player; oscillating means for producing an oscillating output having an oscillating frequency shifted from a predetermined central frequency in accordance with the difference in phase between said reference and reproduced frame signals; and signal generating means for generating a line synchronization signal having a predetermined frequency in synchronization with said external reference synchronization signal; said video disk player performing a control with respect to time axis with the oscillating output of said oscillating means as a reference when said phase difference is not less than a predetermined value, and performing the control with respect to a time axis with said line synchronization signal as a reference when said phase difference is less than said predetermined value, the central frequency of said oscillating means and the frequency of said line synchronization signal being equal to a frequency four times a color subcarrier frequency.

Further, the video disk player further comprises signal selecting means for selectively outputting the oscillating output of said oscillating means when said phase difference is not less than said predetermined value, and selectively outputting said line synchronization signal when said phase difference is less than said predetermined value, and video signal producing means for producing a video signal based on an output of said signal selecting means, and an output of said video signal producing means is selectively outputted in place of said read video signal when the output of said read video signal is stopped.

DETAILED DESCRIPTION OF THE PREFERRED EMBODIMENTS

The embodiments of the present invention will now be described in detail with reference to FIGS. 1 and 2.

Figure 1:
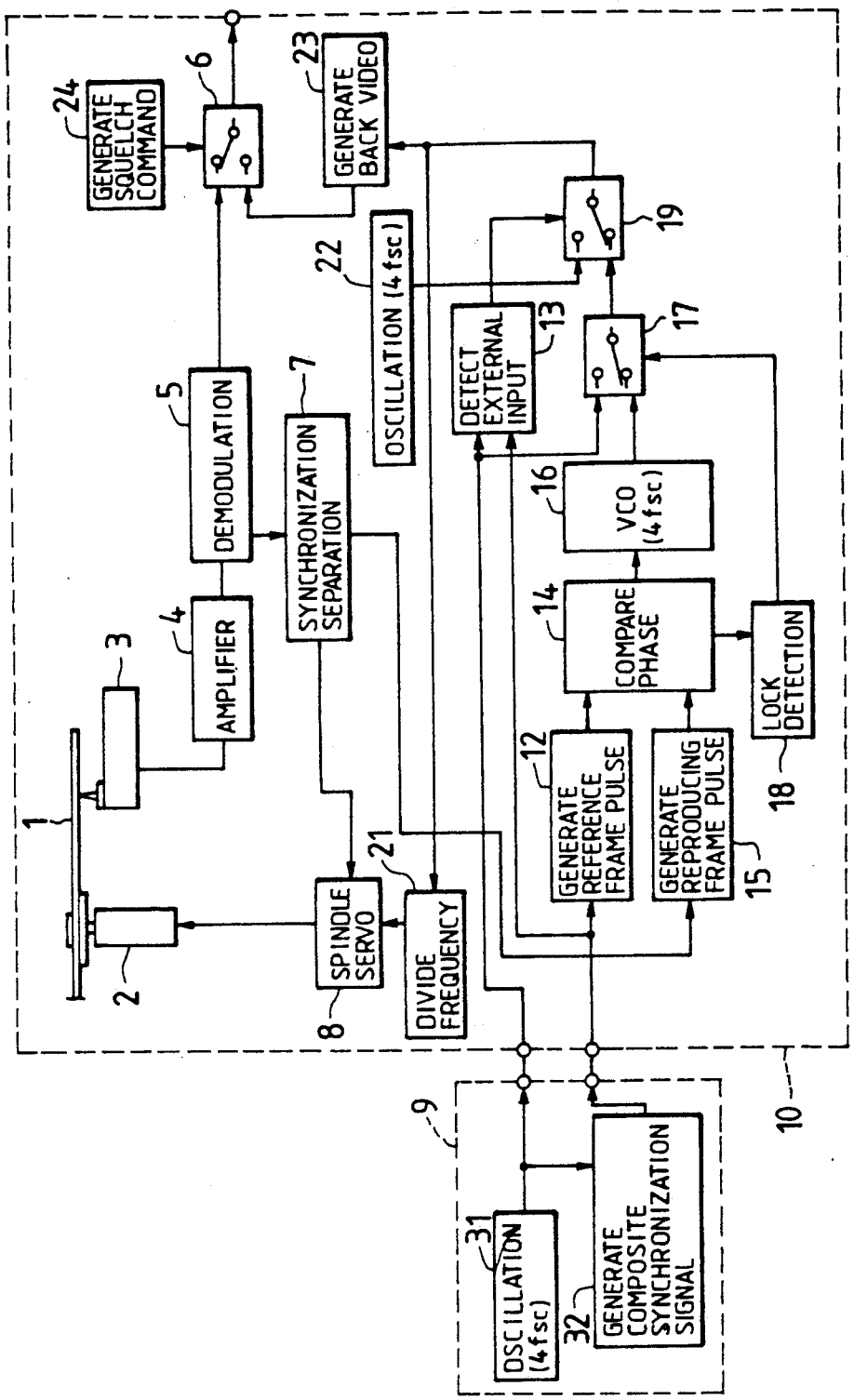
FIG. 1 is a block diagram showing one embodiment of a video disk player in accordance with the present invention.
Figure 3:
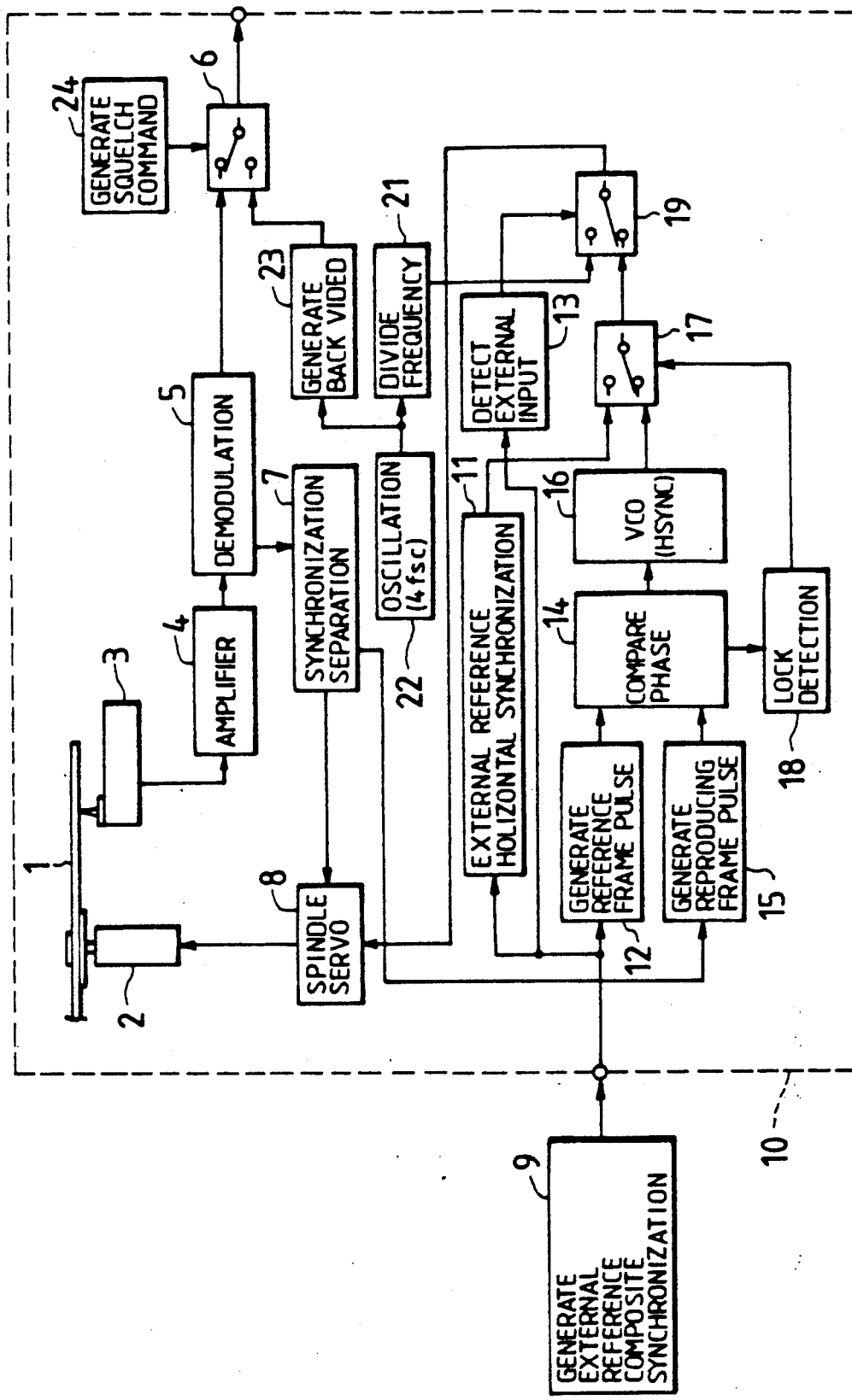
FIG. 3 is a block diagram showing a conventional video disk player.

In FIG. 1, disk spindle motor 2 pickup 3, RF-amplifier 4. FM-demodulating circuit 5, change-over switches 6, 17, 19, synchronization separating circuit 7, spindle servo circuit 8, external reference composite synchronization signal generating circuit 9, reference frame pulse generating circuit 12, external input detecting circuit 13, phase comparing circuit 14, reproducing frame pulse generating circuit 15, VCO 16, lock detecting circuit 18, oscillator 22, background video generating circuit 23 and squelch command signal generating circuit 24 are connected to each other in a way similar to that of the apparatus of FIG. 3. However, in this embodiment, external reference composite synchronization signal generating circuit g is composed of reference signal generating circuit 31 for generating an external reference signal having a frequency four times the frequency of a color subcarrier frequency, and composite synchronization signal generating circuit 32 for generating an external reference composite synchronization signal based on this external reference signal. The external reference signal outputted from external reference composite synchronization signal generating circuit 9 is supplied to external input detecting circuit 13 and one input terminal of change-over switch 17. The external reference composite synchronization signal is supplied to reference frame pulse generating circuit 12 and external input detecting circuit 13. Similar to the case of the apparatus of FIG. 3 for example external input detecting circuit 13 detects that the external reference signal and the external reference composite synchronization signal are supplied by detecting the interval of an input pulse by a monostable multivibrator, etc., and generates an external input detecting signal. The output of external input detecting circuit 13 is provided as a control input of change-over switch 19.

An output of oscillator 22 is supplied to one input terminal of change-over switch 19. The output of change-over switch 19 is supplied to background video generating circuit 23 and is simultaneously divided by frequency divider 21 with respect to frequency and is thereafter supplied to spindle servo circuit 8 as a reference horizontal synchronization signal.

A self-scanning frequency of VCO 16 in this embodiment is set to frequency $4f_{sc}$ and the oscillating frequency of VCO 16 is changed in accordance with the difference signal from phase comparing circuit 14 with frequency $4f_{sc}$ as a center.

In the construction mentioned above, when the external reference composite synchronization signal and the external reference signal are not supplied from external reference composite synchronization signal generating circuit 9, no external input detecting signal is outputted from external input detecting circuit 13 and the internal reference signal having frequency $4f_{sc}$ outputted from oscillator 22 is selectively outputted from change-over switch 19. This internal reference signal is divided by frequency divider 21 with respect to frequency and is supplied as a reference horizontal synchronization signal to spindle servo circuit 8. As a result, the rotary speed of spindle motor 2 is controlled such that the phase of the horizontal synchronization signal in the read video signal is in conformity with the phase of the reference horizontal synchronization signal by the internal reference signal, thereby performing a control with respect to the time axis of the read video signal.

Next, when the external reference composite synchronization signal and the external reference signal are supplied from external reference composite synchronization signal generating circuit 9, the external input detecting signal is outputted from external input detecting circuit 13 and is supplied to change-over switch 19. Then, the output of change-over switch 17 is selectively outputted to change-over switch 19. At this time, when the lock detecting signal is not outputted from lock detecting circuit 18, the output of VCO 16 is selectively outputted from change-over switch 17.

The oscillating frequency of VCO 16 is changed in accordance with the difference in phase between the reference frame pulse and the reproduced frame pulse with frequency $4f_{sc}$ as a center. The output of VCO 16 is supplied to frequency divider 21 through change-over switches 17 and 19 and is divided with respect to frequency and is supplied as a reference horizontal synchronization signal to spindle servo circuit 8. As a result, the rotary speed of spindle motor 2 is accelerated and decelerated in accordance with the phase difference between the reference and reproduced frame pulses. When the reproduced frame pulses are in advance of the reference frame pulses, the oscillating frequency of VCO 16 is lowered and a loop delaying the reproduced pulses is formed so that both frame pulses are changed so as to be in conformity with each other. As a result, first and second fields of the reproducing composite synchronization signal and a vertical synchronization signal are in conformity with the external reference composite synchronization signal. At this time, when the phase difference of both frames is less than a predetermined value, a lock detecting signal is outputted from lock detecting circuit 18 and the stable external reference signal having frequency $4f_{sc}$ as the output of external reference composite synchronization signal generating circuit 9 is selectively outputted from change-over switch 17, thereby completing the external synchronization.

Figure 2:
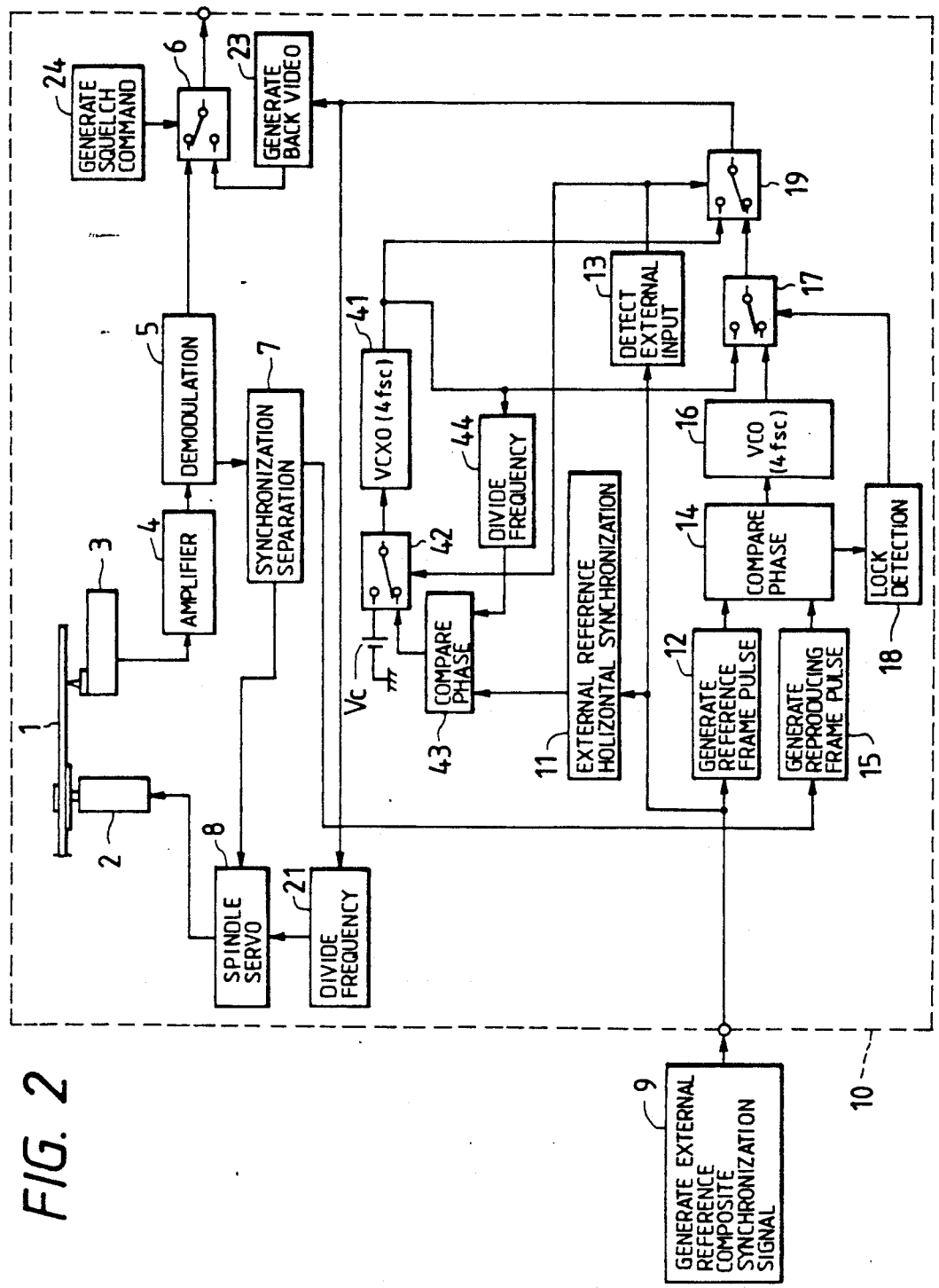
FIG. 2 is a block diagram showing another embodiment of a video disk player of the present invention.

FIG. 2 is a block diagram showing another embodiment of the video disk player of the present invention. In FIG. 2, disk 1, spindle motor 2, pickup 3, RF-amplifier 4, FM-demodulating circuit 5, change-over switches 6, 17, 19, synchronization separating circuit 7, spindle servo circuit 8, external reference composite synchronization signal generating circuit 9, reference frame pulse generating circuit 12, external input detecting circuit 13, phase comparing circuit 14, reproducing frame pulse generating circuit 15, VOC 16, lock detecting circuit 18, frequency divider 21, background video generating circuit 23 and squelch command signal generating circuit 24 are connected to each other in a way similar to that of the apparatus of FIG. 1. However, in this embodiment, an output of VCXO (voltage control-type crystal oscillator) 41 is supplied to one input terminal of each of change-over switches 17 and 19. An output of change-over switch 42 is supplied to a control input terminal of VCXO 41. A predetermined control voltage $V_c$ is supplied to one input terminal of change-over switch 42. This control voltage $V_c$ is set to a value at which the oscillating frequency of VCXO 41 is frequency $4f_{sc}$ when this control voltage is supplied to the control input terminal of VCXO 41. An output of phase comparing circuit 43 is supplied to the other input terminal of change-over switch 42. The output of external reference horizontal synchronization signal generating circuit 11 and an output of frequency divider 44 are supplied to phase comparing circuit 43. Frequency divider 44 divides the output of VCXO 41 with respect to frequency and generates a signal having a frequency approximately equal to a horizontal synchronization frequency. The external input detecting signal is supplied to the control input terminal of change-over switch 42 from external input detecting circuit 13. Change-over switch 42 selectively outputs control voltage $V_c$ when the external input detecting signal is not provided, and selectively outputs the output of phase comparing circuit 43 when the external input detecting signal is provided.

In the construction mentioned above, when no external reference composite synchronization signal is supplied from external reference composite synchronization signal generating circuit 9, the external input detecting signal is not outputted from external input detecting circuit 13 and the output of VCXO 41 is selectively outputted from change-over switch 19. Control voltage $V_c$ is selectively outputted from change-over switch 42 and is supplied to the control input terminal of VCXO 41 so that a signal having frequency $4f_{sc}$ is outputted from VCXO 41. The output of VCXO 41 is divided by frequency divider 21 with respect to frequency through change-over switch 19 and is supplied as a reference horizontal synchronization signal to spindle servo circuit 8. As a result, the rotary speed of spindle motor 2 is controlled such that the phase of the horizontal synchronization signal in the read video signal is in conformity with the phase of the reference horizontal synchronization signal by the internal reference signal, thereby performing a control with respect to the time axis of the read video signal.

Next, when the external composite synchronization signal is supplied from external reference composite synchronization signal generating circuit 9, the external input detecting signal is outputted from external input detecting circuit 13 and is supplied to change-over switches 19 and 42, Thus, the output of phase comparing circuit 43 is selectively outputted to change-over switch 42 and is supplied to VCXO 41 so that a stable signal having n frequency $4f_{sc}$ in synchronization with the external reference horizontal synchronization signal is outputted from VCXO 41. Further the output of change-over switch 17 is selectively outputted to change-over switch 19. At this time, when no lock detecting signal is outputted from lock detecting circuit 18, the output of VCO 16 is selectively outputted from change-over switch 17.

The oscillating frequency of VCO 16 is changed in accordance with the difference in phase between the reference and reproducing frame pulses with frequency $4f_{sc}$ as a center. The output of VCO 16 is supplied to frequency divider 21 through change-over switches 17 and 19 and is divided by this frequency divider with respect to frequency, and is supplied as a reference horizontal synchronization signal to spindle servo circuit 8. As a result, the rotary speed of spindle motor 2 is accelerated and decelerated in accordance with the difference in phase between the reference and reproduced frame pulses. When the reproduced frame pulses are advanced relative to the reference frame pulses, the oscillating frequency of VCO 16 is lowered and a loop delaying the reproducing phase is formed so that both frame phases are changed so as to be in conformity with each other. As a result, first and second fields of the reproducing composite synchronization signal and the vertical synchronization signal are in conformity with the external reference composite synchronization signal. At this time, when the phase difference of both frames is less than a predetermined value, the lock detecting signal is outputted from lock detecting circuit 18 and a stable signal having frequency $4f_{sc}$ in synchronization with the external reference horizontal synchronization signal is selectively outputted from change-over switch 17, thereby completing the external synchronization.

As mentioned above, in the video disk player in accordance with the present invention, a video disk player has reproducing frame signal generating means for generating a reproduced frame signal once every frame period based on a synchronization signal in a read video signal provided from a disk; reference frame signal generating means for generating a reference frame signal once every frame period based on an external reference synchronization signal supplied from the exterior of the player; and oscillating means for producing an oscillating output having an oscillating frequency shifted from a predetermined central frequency in accordance with the difference in phase between the reference and reproducing frame signals. The video disk player performs a control with respect to time axis with the oscillating output of the oscillating means as a reference when the phase difference is not less than a predetermined value, and performing the control with respect to time axis With, as a reference, a line synchronization signal having a predetermined frequency in synchronization with the external reference synchronization signal when the phase difference is less than the predetermined value. The central frequency of the oscillating means and the frequency of the line synchronization signal are equal to a frequency four times a color subcarrier frequency Accordingly, the video disk player in accordance with the present invention does not directly process the reference horizontal synchronization signal, but processes the signal having a frequency four times the color subcarrier frequency as a reference for producing the reference horizontal synchronization signal. Therefore, the video disk player of the present invention can use an integrated circuit disk such that a spindle servo circuit and a frequency divider for producing the reference horizontal synchronization signal supplied to this spindle servo circuit are formed on a single chip and the reference horizontal synchronization signal is internally produced. Further, since a signal having a frequency four times the color subcarrier frequency is used as a reference signal for almost all video equipment, the present invention can be applied to any video disk player.

The player further comprises signal selecting means for selectively outputting the oscillating output of the oscillating means when the phase difference is not less than the predetermined value, and selectively outputting the line synchronization signal in synchronization with the external synchronization signal when the phase difference is less than the predetermined value and video signal producing means for producing a video signal based on an output of the signal selecting means, and an output of the video signal producing means is selectively outputted in place of the read video signal when the output of the read video signal is stopped. Accordingly the reference signal for generating a background video signal is in conformity with a reference signal for time axis servo such as spindle servo, etc., for performing a time axis control of the read video signal. Therefore, a reproduced image can be prevented from being disturbed by the disturbance of the timing of the vertical synchronization signal when the background video signal and the read video signal are switched.

What is claimed is:

1. A video disk player of the type which has spindle control means responsive to a control signal for spindle control, and which reads video signals from a disk and operates with a color subcarrier frequency $f_{sc}$, said video signals including synchronization signal, said player comprising:

reproducing frame signal generating means for receiving a read video signal read from a disk and generating a reproduced frame signal once every frame period based on a synchronization signal in said read video signal;

reference frame signal generating means for receiving an external reference synchronization signal supplied from an exterior of the player and generating a reference frame signal once every frame period based on said external reference synchronization signal;

oscillating means receiving said reproduced and reference frame signals, for producing an oscillation output signal having an oscillating frequency shifted from a central frequency of four times a color subcarrier frequency in accordance with a phase difference between said reference and reproduced frame signals;

line synchronization signal means for receiving said external reference synchronization signal and providing a line synchronization signal having a frequency of four times a color subcarrier frequency in synchronization with said external reference synchronization signal; and selectively providing means for receiving said oscillation output signal and line synchronization signal and selectively providing one of said line synchronization signal and oscillation output signal as said control signal for spindle control of said disk player, a selection of one of said line synchronization signal and said oscillation output signal as an output being dependent upon said phase difference being less than or greater than a predetermined minimum, respectively.

2. A video disk player as claimed in claim 1, wherein said spindle control means comprises:

a spindle servo circuit for providing a control signal to a spindle, and a frequency divider, said control signal being supplied as an input to said frequency divider, an output from said frequency divider being supplied to said spindle servo circuit.

3. A video disk player as claimed in claim 1, wherein said external reference synchronization signal includes a line synchronization signal at a frequency $4f_{sc}$, and said line synchronization signal means comprises a connection for connecting said line synchronization signal to said selectively providing means.

4. A video disk player as claimed in claim 3, further comprising an internal oscillator for generating an internal $4f_{sc}$ reference signal, and a signal selection means for receiving said internal $4f_{sc}$ reference signal and control signal and selectively applying an output thereof, a selection of one of said internal $4f_{sc}$ reference signal and said control signal being dependent upon the absence and presence, respectively, of said external reference synchronization signal.

5. A video disk player as claimed in claim 4, further comprising;

background video generating means for generating internal signals representing a selective display of information on a video screen, wherein the output of said signal selection means is connected as a reference signal input to said background video generator.

6. A video disk player as claimed in claim 1, wherein said line synchronization signal means comprises:

means for receiving and being responsive to said external reference synchronization signal for generating an external reference horizontal synchronization signal:

frequency divider means for receiving and dividing a frequency input thereto at substantially $4f_{sc}$ for producing a first reference frequency;

phase comparator means for receiving said first reference frequency and said external reference horizontal synchronization signal and generating a phase comparator output representing a phase difference between said first reference frequency and said external reference horizontal synchronization signal;

a crystal VCO centered at $4f_{sc}$ and responsive to a voltage input to vary its output frequency;

VCO selection means for receiving said phase comparator output and selectively applying a fixed voltage or said phase comparator output as the input to said crystal VCO, a selection of one of said fixed voltage and phase comparator output being dependent upon the absence or existence of said external reference synchronization signal; and means connecting the output from said crystal VCO as the input to said frequency divider means as an input to said selectively providing means.

7. A video disk player as claimed in claim 6, further comprising:

internal/external signal selecting means for receiving and selectively applying one of said external reference synchronization signal and oscillation output signal to an output thereof, a selection of one of said oscillation output and external reference synchronization signal being dependent upon the absence and presence, respectively, of said external reference synchronization signal, the output from said crystal VCO being connected to the first input of said internal/external signal selecting means, the oscillation output signal of said oscillating means being connected as the second input of said internal/external signal selecting means, the output of said signal selecting means being connected to said spindle control means.

8. A video disk player as claimed in claim 7, further comprising;

background video generating means for generating internal signals representing a selective display of information on a video screen, wherein the output of said internal/external signal selecting means is connected as a reference signal input to said background video generator.

* * * * *